May 27, 1969     F. E. DUFFIELD     3,447,117

TRANSDUCING DEVICES

Filed April 29, 1966

INVENTOR
Frederick Edward Duffield
BY
Lawrence E. Laubscher
ATTORNEY

United States Patent Office 3,447,117
Patented May 27, 1969

3,447,117
TRANSDUCING DEVICES
Frederick E. Duffield, New Denham, England, assignor to Ether Engineering Limited, formerly called: Ether Langham Thompson Limited
Filed Apr. 29, 1966, Ser. No. 546,247
Claims priority, application Great Britain, Apr. 29, 1965, 18,063/65
Int. Cl. G01b 7/16
U.S. Cl. 338—6
4 Claims

ABSTRACT OF THE DISCLOSURE

Transducing means for producing an electrical signal as a function of a force applied to a transducer. In one embodiment, a flexure member is mounted to define a gap relative to a fixed support, the extent of cantilever bending effected by the application of acceleration forces to the transducer being measured by a semi-conductive piezo-resistive element. In another embodiment, load cell means are provided in which the strain applied to a support is measured by the piezo-resistive element.

This invention relates to transducing devices and more particularly to transducers serving to produce an electrical output which is a function of a force applied to the transducer. The invention can be applied with particular advantage to an accelerometer, in which case relative displacement of two members is caused by distributed inertial force acting on the device.

The invention provides a transducing device responsive to an applied force comprising a strain structure defining a gap whose width is a function of said applied force, and transducer element responsive to longitudinal strain secured across said gap, whereby the output of said transducer element is a function of said applied force.

Other features and advantages of the invention will appear from the following description of an embodiment thereof, given by way of example, in conjunction with the accompanying drawings, in which.

Figure 1:
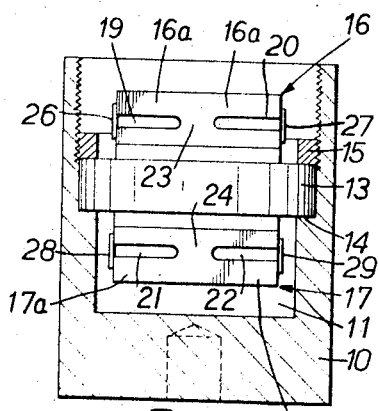
FIGURE 1 is a side elevational view of an accelerometer, with the housing in section.
Figure 2:
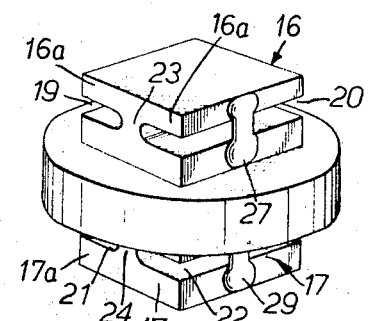
FIGURE 2 is a diagrammatic perspective view of the transducer portion proper of the accelerometer shown in FIGURE 1.

The accelerometer shown in FIGURES 1 and 2 comprises a housing 10 which may be of cylindrical form, bored out to form a cavity 11 to receive the transducer proper. A body member is housed with the cavity 11; the body is formed with a central cylindrical portion 13 which seats against a shoulder 14 in the cavity, and the body being held by a screwed ring 15. Above and below the cylindrical portion 13 the body is machined to form two generally rectangular block-like portions 16 and 17, and portion 16 is slotted by two straight slots 19 and 20, portion 17 being similarly slotted at 21 and 22. The two slots 19 and 20 penetrate sufficiently deeply into the block portion 16 to leave a comparatively narrow connecting neck portion 23; there is similarly formed a neck portion 24 between the inner ends of slots 21 and 22. The upper portion 16a of the block 16 which is supported only by a neck portion 23 forms a seismic flexure member for the accelerometer, and the lower portion 17a of block 17, supported only by neck 24, forms another such seismic flexure member.

When body 12 is subjected to acceleration, depending upon the direction of acceleration, the seismic flexure members 16a, 17a will flex, so that the adjacent edges of the slots 19 and 20, and 21 and 22 will open or close slightly.

The open edges of the slots are bridged by semiconductor strain gauges 26, 27, 28, and 29. Each semiconductor strain gauge consists of a small strip of monocrystalline semiconductor material, such as silicon, which is doped, or locally doped; connections, not shown, are made to terminals provided at the ends of each strain gauge. The strain gauges can be incorporated in the four arms of a bridge circuit, or can be otherwise used in indicating or control means.

The device described has substantial advantages in practice. It is possible to arrange that the vibrating systems which include the two seismic portions of the body and the associated semiconductor strain gauges have a very high natural resonant frequency and that the frictional loss in this system is low. The strain gauges can be physically very small, so as to contribute very small losses to the vibrating systems. Moreover, the strain gauges, being unbounded, respond predominantly to the displacement of the sides of the gap in the body which the strain gauge spans, so that the strain gauge acts as a displacement gauge, rather than responding to the strain in the body of the transducer. Accordingly, there results a sensitive type of accelerometer usable over a wide operating frequency range. In this operating range there will be only a very small phase shift in the response.

It will be understood that the dimensions of the device may be adjusted to provide the required range of accelerations. Also, configurations other than those using the cantilever beam described can be used.

Figure 3:
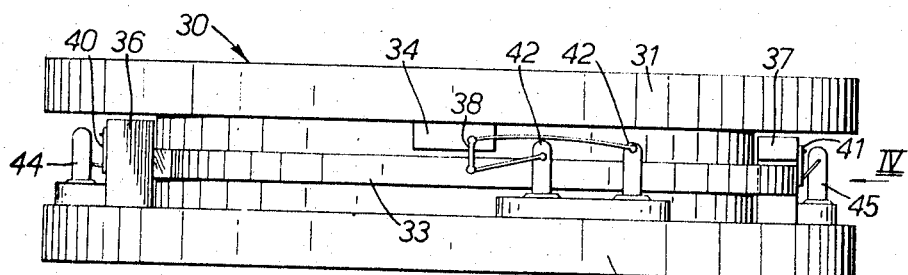
FIGURE 3 is an elevational diagrammatic view of a load cell.
Figure 4:
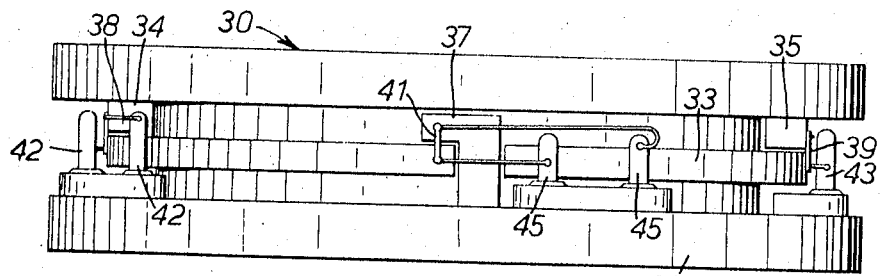
FIGURE 4 is an elevational diagrammatic view of the load cell as seen from the direction of the arrow IV in FIGURE 3.

The load cell shown in FIGURES 3 and 4 comprises a steel body 30 from which a circumferential groove is cut to leave enlarged flange portions 31 and 32 projecting from the flat faces of the body, and a rib or fourth portion 33 projecting from the centre of the groove. A pair of studs 34 and 35 project from the flange 31 towards the rib 33, defining with the rib 33 respective gaps, the studs 34 and 35 being disposed diametrically opposite each other. The rib 33 is cut away in two portions to accommodate respective L-shaped extension members 36 and 37. The legs of the L-shaped members are secured to the flange 32 and project through the rib 33, the feet of the L-shaped members extending beside the rib 33 of the other side from the flange 32 to define respective gaps with the rib 33.

Semiconductor strain gauge elements 38, 39, 40, and 41 are cemented at one end to the rib 33, and at the other end to respective ones of projections 34 to 37. Connections are made from the ends of the strain gauge elements to respective pairs of terminal pillars 42, 43, 44 and 45 which are mounted on insulating blocks secured to the flange 32. The strain gauge elements may be connected in pairs as potential divider chains in a comparator circuit, or may be connected in other ways in indicating or measuring devices.

In use the device may be used to measure a mechanical load applied between the two flat faces of the body 30. The resulting small deformation of the body 30 alters the width of the gaps across which the strain gauge elements are cemented, and the consequent strain of the strain gauge elements can be used to given an indication of the applied load. It will be appreciated that the resulting load cell is extremely rugged, since the body 30 bears substantially the whole of the load applied to it, while the strain gauge elements may be relatively mechanically weak.

In use, the periphery of the device may be covered by an annular collar of plastics material to protect the strain gauges against dust and dirt.

I claim:
1. Acceleration-responsive transducer means, comprising
a block-like strain body adapted to longitudinally receive the force of acceleration, said body containing adjacent one end a pair of opposed transverse slots that extend toward each other in a transverse plane to define a longitudinaly-extending narrow central neck portion, said slots being so spaced from the end of said body to define also a pair of transverse flexure members supported at their adjacent ends by said neck portion;
and a pair of transducer means connected to bridge the free ends of said slots, respectively, each of said transducer means being responsive to the longitudinal strain applied thereto so that the output of the transducer means is a function of the acceleration forces imparted to said body, each of said transducer means including a pair of electrical terminals, and an elongated body of relatively weak semi-conductive piezoresistive material extending between said terminals.

2. Acceleration-responsive transducer means as defined in claim 1, and further including a second strain body also adapted to longitudinally receive the force of acceleration, said second body containing at one end a second pair of opposed transverse slots defining a second neck portion and a second pair of flexure members;
means connecting together the other ends of said strain bodies to form a rigid unit, whereby the strain bodies are longitudinally oppositevly arranged;
a second pair of transducer means connected to bridge the free ends of the second slots, whereby the transducer means associated with the gaps of one body respond in opposite senses to the transducer means associated with the gaps of the other body;
a housing;
and means for mounting said body unit in said housing, comprising support means connected with the connected ends of said bodies.

3. Transducing means responsive to an applied force, comprising
strain body means adapted to longitudinally bear said applied force, said strain body means including a central first portion, second and third enlarged portions carried in spaced relation by said first portion, respectively, and a fourth portion carried by said first portion between and spaced from said second and third portions, respectively, said fourth portion cooperating with said second portion to define a first gap;
extension means carried by third portion for cooperation with that surface on said fourth portion that is adjacent said second portion to define a second gap, whereby upon the application of force to said strain body means, the width of said further gap varies in the opposite sense to that of the first gap;
and a pair of transducer means connected with said strain body means to bridge said first and second gaps, respectively, each of said transducing elements including a pair of electrical terminals and an elongated body of relatively weak semi-conductive piezo-resistive material extending between said terminals and being responsive to longitudinal strain, whereby the two transducer means respond in opposite senses, respectively, to the applied force.

4. Apparatus as defined in claim 3, wherein said first, second, third and fourth body portions are cylindrical.

References Cited

UNITED STATES PATENTS

| 2,855,489 | 10/1958 | Ruge | 338—6 |
| 3,031,634 | 4/1962 | Vogt. | |
| 3,351,880 | 11/1967 | Wilmer | 338—6 |

REUBEN EPSTEIN, *Primary Examiner.*

U.S. Cl. X.R.

73—88.5, 141; 338—2, 5